(12) United States Patent
Bauer et al.

(10) Patent No.: US 11,335,965 B2
(45) Date of Patent: May 17, 2022

(54) HEATING DEVICE FOR A PRISMATIC BATTERY CELL OF A HIGH-VOLTAGE BATTERY OF A MOTOR VEHICLE, BATTERY CELL, BATTERY MODULE, HIGH-VOLTAGE BATTERY AND MOTOR VEHICLE

(71) Applicant: Bayerische Motoren Werke Aktiengesellschaft, Munich (DE)

(72) Inventors: Christoph Bauer, Herrsching (DE); Simon Nuernberger, Bad Aibling (DE); Jan Philipp Schmidt, Holzmaden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/977,530

(22) PCT Filed: Jun. 6, 2019

(86) PCT No.: PCT/EP2019/064907
§ 371 (c)(1),
(2) Date: Sep. 2, 2020

(87) PCT Pub. No.: WO2020/007569
PCT Pub. Date: Jan. 9, 2020

(65) Prior Publication Data
US 2020/0403284 A1    Dec. 24, 2020

(30) Foreign Application Priority Data
Jul. 4, 2018 (DE) .................... 10 2018 211 005.0

(51) Int. Cl.
*H01M 10/6571* (2014.01)
*H01M 10/615* (2014.01)
(Continued)

(52) U.S. Cl.
CPC ......... *H01M 10/6571* (2015.04); *B60L 58/27* (2019.02); *H01M 10/615* (2015.04);
(Continued)

(58) Field of Classification Search
CPC ........... H01M 10/6571; H01M 10/615; H01M 10/625; H01M 10/647; H01M 10/6554; B60L 58/27; H05B 3/34
See application file for complete search history.

(56) References Cited

U.S. PATENT DOCUMENTS 3,527,925 A * 9/1970 Takeo ................. H05B 3/00
219/521
2005/0089750 A1* 4/2005 Ng .................... H01M 10/6567
429/120
(Continued)

FOREIGN PATENT DOCUMENTS

EP      3 057 172 A1    8/2016
EP      3 098 897 A1    11/2016
(Continued)

OTHER PUBLICATIONS

Schliffer Albert, FR2718888, english translation, Published Oct. 20, 1995 (Year: 1995).*
International Search Report (PCT/ISA/210) issued in PCT Application No. PCT/EP2019/064907 dated Sep. 11, 2019 with English translation (six (6) pages).
German-language Written Opinion (PCT/ISA/237) issued in PCT Application No. PCT/EP2019/064907 dated Sep. 11, 2019 (eight (8) pages).
(Continued)

*Primary Examiner* — Jimmy Vo
(74) *Attorney, Agent, or Firm* — Crowell & Moring LLP

(57) ABSTRACT

A heating device for a prismatic battery cell of a high-voltage battery of a motor vehicle includes two sheet-shaped heating elements to be arranged on two opposite lateral outer sides of a cell housing of the battery cell, and two connecting elements to be arranged on a housing cover of the cell housing. The connecting elements are electrically connected to terminals of the two heating elements. The connecting elements are flexibly formed, at least in certain regions, and
(Continued)

as a result the heating elements are connected in a hinge-like manner. The heating device can be arranged by arranging the first heating element on the first lateral outer side of the cell housing, swinging the second heating element over the housing cover, and arranging the second heating element on the second lateral outer side on the cell housing.

15 Claims, 1 Drawing Sheet

(51) Int. Cl.
  *H01M 10/625* (2014.01)
  *H01M 10/647* (2014.01)
  *H01M 10/6554* (2014.01)
  *B60L 58/27* (2019.01)
  *H05B 3/34* (2006.01)
(52) U.S. Cl.
  CPC ....... *H01M 10/625* (2015.04); *H01M 10/647* (2015.04); *H01M 10/6554* (2015.04); *H05B 3/34* (2013.01); *H01M 2220/20* (2013.01); *H05B 2203/003* (2013.01); *H05B 2203/014* (2013.01); *H05B 2203/016* (2013.01)

(56) References Cited

U.S. PATENT DOCUMENTS

| | | |
|---|---|---|
| 2010/0151307 A1 | 6/2010 | Naganuma |
| 2013/0307483 A1 | 11/2013 | Yoshida |
| 2014/0050964 A1 | 2/2014 | Koeroesi et al. |
| 2018/0090949 A1* | 3/2018 | Lim ........................ H01M 2/30 |

FOREIGN PATENT DOCUMENTS

| | | |
|---|---|---|
| FR | 1 557 516 A | 2/1969 |
| FR | 2 718 888 A1 | 10/1995 |
| JP | 2011-243524 A | 12/2011 |
| WO | WO 2012/120090 A1 | 9/2012 |

OTHER PUBLICATIONS

German-language Office Action issued in German Application No. 10 2018 211 005.0 dated Mar. 1, 2019 with English translation (10 pages).

German-language Decision to Grant issued in German Application No. 10 2018 211 005.0 dated Mar. 12, 2019 with English translation (10 pages).

* cited by examiner

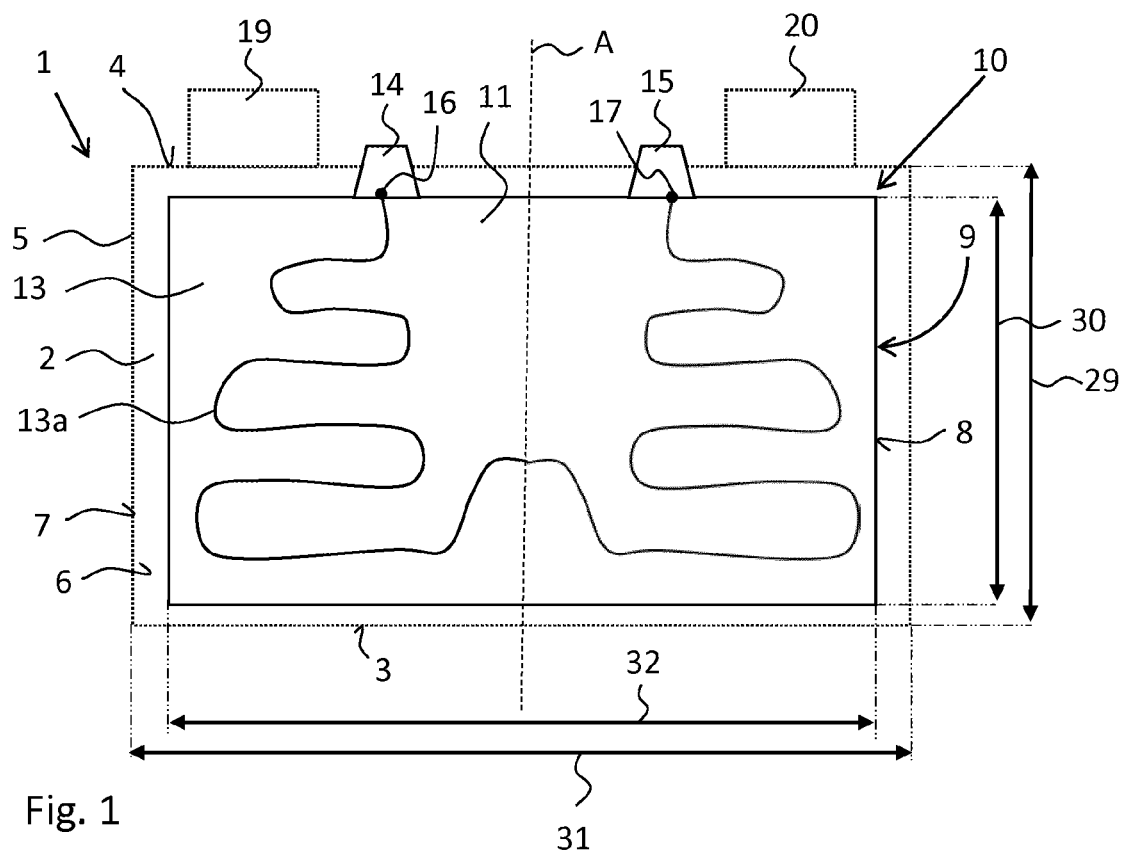
Fig. 1
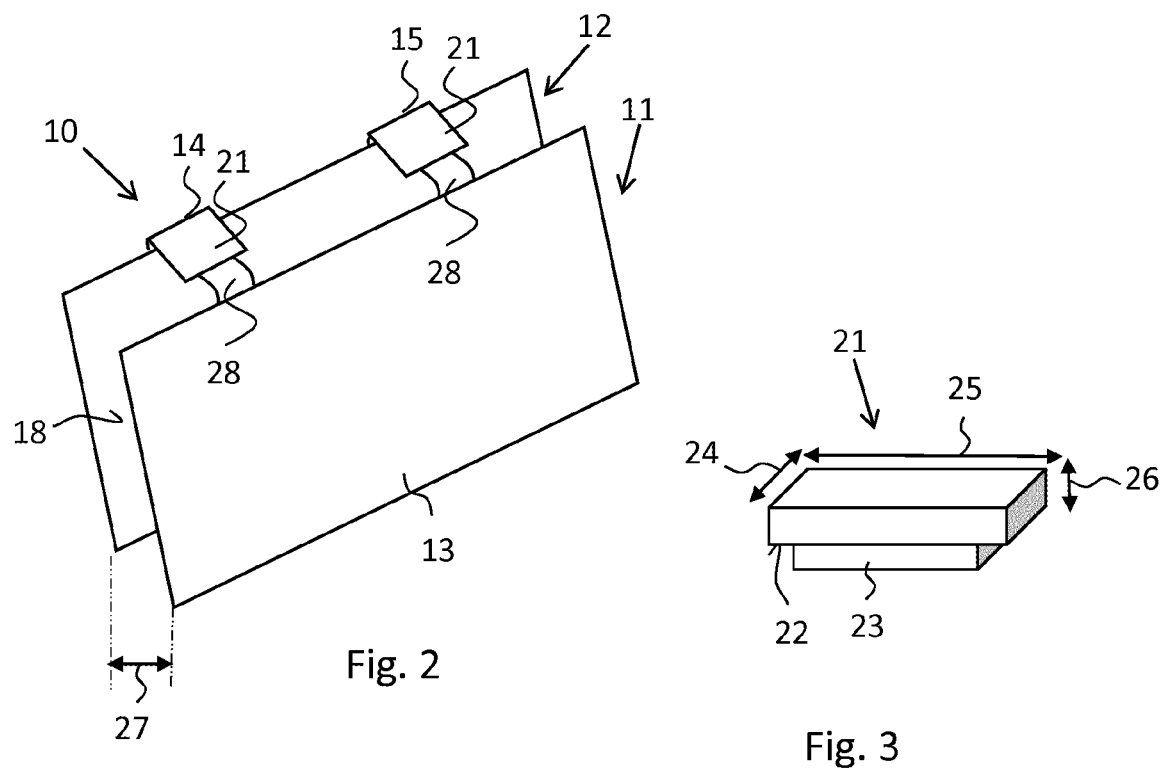
Fig. 2
Fig. 3

HEATING DEVICE FOR A PRISMATIC BATTERY CELL OF A HIGH-VOLTAGE BATTERY OF A MOTOR VEHICLE, BATTERY CELL, BATTERY MODULE, HIGH-VOLTAGE BATTERY AND MOTOR VEHICLE

BACKGROUND AND SUMMARY OF THE INVENTION

The invention relates to a heating device for a prismatic battery cell of a high-voltage battery of a motor vehicle. The invention also relates to a battery cell, to a battery module, to a high-voltage battery and to a motor vehicle.

The focus here is, in particular, on high-voltage batteries or high-voltage accumulators for electrically drivable motor vehicles, for example electric vehicles or hybrid vehicles. Such high-voltage batteries have a multiplicity of battery cells and storage cells which are generally stacked to form a cell stack and are connected to form a battery module. In this context, the maximum power level which can be made available by an electrical battery module generally drops as the operating temperature of the battery cells drops. In the case of an electrically drivable motor vehicle this can lead to a situation in which only a limited drive power level is available at the start of a journey when the external temperatures are low. Therefore, it is known from the prior art to equip the battery modules with a heating device so that the battery cells can be heated where necessary.

WO 2012/120090 A1 discloses an electrical energy store for motor vehicles having at least one battery module in which a flexible electrical heating element, which is formed, for example, by a flexible heating foil, is arranged between at least two storage cells of the battery module. Positioning such heating foils between the battery cells and making contact with the heating foils is usually very costly.

An object of the present invention is to provide a solution with which heating elements can be integrated into a battery module of a high-voltage battery for an electrically drivable vehicle in a particularly simple way and without high cost.

This object is achieved according to the invention by means of a heating device, a battery cell, a battery module, a high-voltage battery and a motor vehicle having the features according to the respective independent patent claims. Advantageous embodiments of the invention are the subject matter of the dependent patent claims, of the description and of the figures.

A heating device according to the invention for a prismatic battery cell of a high-voltage battery of a motor vehicle comprises two sheet-shaped heating elements for arrangement on two opposite lateral outer sides of a cell housing of the battery cell, and two connecting elements which connect the heating elements mechanically and electrically, for arrangement on a housing cover of the cell housing and for connecting to an energy source which makes available a heating current. In order to energize the heating elements with the heating current, the first connecting element is electrically connected to first terminals of the two heating elements, and the second connecting element is electrically connected to second terminals of the two heating elements. The connecting elements are embodied flexibly, at least in certain areas, wherein the heating elements are connected in a hinge-like manner as a result. The heating device can be arranged on the cell housing by arranging the first heating element on the first lateral outer side of the cell housing, folding the second heating element, connected in a hinge like manner to the first heating element by the connecting elements, over the housing cover and arranging the second heating element on the second lateral outer side.

The invention also relates to a prismatic battery cell for a high-voltage battery of a motor vehicle, comprising a cell housing with a housing casing and a housing cover, on which cell terminals of the battery cell are arranged, and a heating device according to the invention, wherein the sheet-shaped heating elements are arranged on two opposite lateral outer sides of the housing casing and the connecting elements are arranged between the cell terminals on the housing cover.

In addition, the invention relates to a battery module for a high-voltage battery of a motor vehicle having a multiplicity of battery cells which are stacked one on the other, according to the invention, and having two module terminals which are connected to the cell terminals of the battery cells in accordance with a predetermined wiring arrangement, wherein in order to make available the heating current for the heating devices from the battery cells, the first connecting elements of the heating devices are electrically connected to one another and to the first module terminal of the battery module, and the second connecting elements of the heating devices are electrically connected to one another and to the second module terminal of the battery module, wherein the first connecting elements and/or the second connecting elements are connected to the respective module terminal via a controllable switching element.

The prismatic battery cell is embodied as a secondary cell and has a cell housing which is in particular in the shape of a flat parallelepiped and in whose housing interior a cell winding is arranged. The cell housing has an in particular rectangular housing floor, a housing casing and an in particular rectangular housing cover. The housing casing is formed here by four lateral sides, wherein the lateral sides form in particular a front side, a rear side and two side areas of the cell housing. In order to make contact with electrodes of the cell winding, the cell terminals are electrically connected to the electrodes and are guided through the housing cover. The prismatic battery cells can be stacked along a stacking direction to form a cell stack. For this purpose, for example a front side of a battery cell is arranged on the rear side of an adjacent battery cell etc. The cell terminals can be electrically connected to one another in order to connect the battery cells via a cell contact-forming system.

In order to be able to heat the battery cells, for example at low external temperatures, in order to increase a power level, at least one battery cell of the battery module, in particular each battery cell of the battery module, has the heating device which is arranged on an outer side of the cell housing. The heating device has here the planar heating elements and the connecting elements. The connecting elements are configured to connect the heating elements mechanically and electrically to one another. The sheet-shaped heating elements preferably each have a heating foil with an integrated heating resistor which can be energized. A heating foil or a heating sheet has, for example, a thin, in particular flexible carrier with embedded heating resistor or heating wire which extends, for example, in a meandering shape over or in the carrier and which has two terminals. The heating foil can be embodied, for example, in a rectangular shape.

The heating elements, in particular the heating resistors, are connected in parallel here by electrically connecting the first connecting element to the first terminals of the two heating elements, and electrically connecting the second connecting element to the second terminals of the two heating elements. Furthermore, the heating current of the energy source can be fed to the heating elements via the connecting elements. The energy source can be, for example, the battery cell itself or an interconnection of the battery cells of the battery module.

For example, the connecting elements can be electrically connected to the cell terminals of the battery cell via controllable switches, by means of which the heating elements can be connected where necessary to the cell terminals. The connecting elements are embodied flexibly, in particular in a bendable fashion, here, at least in certain areas. As a result, the heating elements are connected to one another by means of hinges in the form of the connecting elements and are embodied in such a way that they can be folded onto one another. For example, the connecting elements can be formed by a ribbon cable, at least in certain areas.

The heating device with the heating elements and the connecting elements is pre-mounted here and, in particular, embodied in a single piece. This means that before the arrangement of the heating device on the cell housing the connecting elements are already electrically and mechanically connected to the heating elements. The heating device therefore has a double heating sheet with two heating sheets which are connected to one another. The heating device is arranged in its entirety on the cell housing. In this context, one of the heating elements is arranged on the first lateral outer side and positioned there in a positionally fixed fashion. The other heating element is then folded over the housing cover using the hinge-like connecting elements in such a way that the other heating element is arranged on the second lateral outer side. When the second heating element is folded over the housing cover, the connecting elements are positioned on the housing cover. The connecting elements are arranged, in particular, between the cell terminals which are arranged on the housing cover. Therefore, the connecting elements form, in addition to the cell terminals of the battery cells, two heating terminals for energizing the heating elements, on the housing cover. The heating device is arranged here in particular on the cell housing in such a way that one of the heating elements is arranged on the outer side of the front side of the cell housing and another of the heating elements is arranged on the outer side of the rear side of the cell housing. Within the cell stack, the heating elements are therefore arranged between two battery cells.

By virtue of the heating device being in a single part and pre-mounted it can be mounted particularly easily and quickly on the battery cells during the fabrication of the battery modules. As a result of the positioning of the connecting elements on the housing cover, they can be placed in contact particularly easily with the energy source in order to energize the heating elements.

It proves advantageous if inner sides, facing the lateral outer sides, of the heating elements are embodied in an adhesive fashion, so that the heating elements can be attached in a materially joined fashion on the lateral outer sides. For example, the heating foil can have an adhesive layer on the inner side facing the lateral outer side. By means of the adhesive layer, the heating elements, in particular the heating foils, can be bonded to the lateral outer sides and thus positioned and attached particularly easily. Furthermore, the adhesion ensures good thermal contact between the heating elements and the lateral outer sides so that a good transmission of heat from the heating elements into the interior of the housing can be achieved.

In one development of the invention, in order to electrically insulate the battery cell, equipped with the heating device, from an adjacent battery cell in a cell stack of the high-voltage battery, outer sides, facing away from the lateral outer sides, of the heating elements are embodied in an electrically insulating fashion. For example, the heating foil can have a carrier made of electrically insulating material, for example a plastic, in which the heating resistor is embedded. The electrically insulating outer side of the heating element can also be embodied in an adhesive fashion here so that the battery cell which is equipped with the heating device can be connected in a materially joined fashion to an adjacent battery cell or the heating device thereof. By virtue of the electrically insulating heating elements it is advantageously possible to dispense with a further insulator or spacer element between the metallic cell housings of the battery cells.

The heating device is preferably embodied in an axial-symmetrical fashion so that a respective distance of the connecting elements from respective side edges of the battery cells is essentially the same. In the stacked state of the battery cells, an upper side of the cell stack which is formed by the housing covers of the battery cells has two rows of cell terminals running parallel to one another and to the stacking direction and two rows of connecting elements located between the latter and running parallel to one another and to the stacking direction. As a result of the symmetrical embodiment of the heating device and the symmetrical embodiment of the cell housing, the battery cell which is equipped with the heating device is also embodied in an axial symmetrical fashion. As a result, the battery cells which are equipped with the heating devices can also be rotated through 180° within the cell stack without changing positions of the connecting elements on the upper side of the cell stack. As a result, the connecting elements can be electrically connected to one another, for example, particularly easily by means of straight busbars which run parallel to the stacking direction.

In one preferred embodiment, a size of a surface of the heating element corresponds to at least one 90% of a size of a surface of the respective lateral outer side, wherein a height of the heating elements is in particular 90% of a height of the cell housing, preferably between 60 mm and 90 mm, particularly preferably approximately 75 mm, and a length of the heating elements is in particular 90% of a length of the cell housing, preferably between 150 mm and 180 mm, particularly preferably approximately 165 mm. As a result of the planar heating elements, which cover at least 90% of the respective lateral outer side, a homogeneous temperature distribution during heating of the battery cell and particularly good inputting of heating to the cell housing of the battery cell can be made available. In particular, the heating elements each have a thickness of at most 200 μm, preferably of at most 150 μm. As a result of this small thickness, which comprises for example thicknesses of the heating foil, of the adhesive layer on the inner side and of the insulating layer on the outer side, a dimension of the entire battery module is increased only slightly.

In one development of the invention, the connecting elements each have a contact plate for electrically connecting to the energy source, as well as flexible conductors, wherein the contact plates are electrically connected to the respective terminals of the heating elements via the flexible conductors. Such contact plates can be particularly easily connected to the energy source, for example a module terminal of the battery module. For this purpose, for example a busbar can be welded onto the contact plates. The contact plate can be, for example, a metallic contact plate and can be formed from the same material as the busbar, for example from aluminum. The contact plates are electrically and mechanically connected to the heating elements via the flexible bendable conductors. As a result of the arrangement of the heating elements on the lateral outer side, the contact plate is in particular arranged bearing on the housing cover.

An under side, facing the housing cover, of the contact plates preferably has an adhesive layer for adhering on the housing cover of the cell housing. The adhesive layer can be, for example, an adhesive pad which is arranged on the underside, so that the contact plates can be secured to the housing cover during the mounting of the heating device on the cell housing. In particular, a width of the contact plates corresponds at most to a thickness of the cell housing, in particular at most to 90% of a thickness of the cell housing. A contact plate can have a width of 15 mm to 19 mm, a length of approximately 10 mm and a thickness of approximately 1 mm to 2 mm.

The invention also relates to a high-voltage battery for a motor vehicle having at least one battery module according to the invention. The high-voltage battery is embodied in particular as a traction battery for the motor vehicle and comprises a multiplicity of battery modules which are connected to one another.

A motor vehicle according to the invention comprises a high-voltage battery according to the invention. The motor vehicle is embodied in particular as an electric vehicle or hybrid vehicle.

The embodiments presented with respect to the heating device according to the invention, and their advantages, apply correspondingly to the battery cell according to the invention, to the battery module according to the invention, to the high-voltage battery according to the invention and to the motor vehicle according to the invention.

Further features of the invention can be found in the claims, the figures and the description of the figures. The features and combinations of features which have been mentioned above in the description and the features and combinations of features which are mentioned below in the description of the figures and/or presented only in the figures can be used not only in the respectively specified combination but also in other combinations or alone.

The invention will now be explained in more detail on the basis of a preferred exemplary embodiment and with reference to the drawings.

BRIEF DESCRIPTION OF THE DRAWINGS

FIG. 1 is a schematic illustration of an embodiment of a battery cell according to the invention.

FIG. 2 is a schematic illustration of an embodiment of a heating device according to the invention.

FIG. 3 is a schematic illustration of a component of a connecting element of the heating device.

In the figures, identical and functionally identical elements are provided with the same reference symbols.

DETAILED DESCRIPTION OF THE DRAWINGS

FIG. 1 shows a prismatic battery cell 1 according to an embodiment of the present invention. The prismatic battery cell 1 can be stacked with a multiplicity of further battery cells 1 to form a cell stack. The battery cells 1 of a cell stack can be connected to form a battery module, wherein a multiplicity of battery modules can in turn be connected to form a high-voltage battery for an electrically drivable motor vehicle. The battery cell 1 has a flat parallelepiped-shaped cell housing 2 with a housing floor 3, a housing cover 4 and a housing casing 5. The housing casing 5 has a plurality of casing sides 6, 7, 8, 9, specifically a frontside 6, two side areas 7, 8 and a rear side 9 opposite the front side 6. Furthermore, the battery cell 1 has a heating device 10 which is shown in a perspective illustration in FIG. 2.

The heating device 10 has two planar heating elements 11, 12. A first heating element 11 is arranged, for example, on an outer side of the front side 6 of the cell housing 2, and a second heating element 12 is arranged, for example, on an outer side of the rear side 9 of the cell housing 2. The heating elements 11, 12 can, for example, each have a heating foil 13 with an integrated heating resistor 13a. In the state in which the heating elements 11, 12 are arranged on the outer sides of the lateral sides 6, 9, the heating resistor 13a can extend in a meandering shape over a surface of the outer sides of the lateral sides 6, 9.

The heating elements 11, 12 are electrically connected to one another here via two connecting elements 14, 15. The heating resistors 13a of the two heating elements 11, 12 are connected in parallel via the connecting elements 14, 15 in that a first terminal 16 of the two heating elements 11, 12 is electrically connected to the first connecting element 14, and a second terminal 17 of the two heating elements 11, 12 is electrically connected to the second connecting element 15. The heating device 10 has, for example, an overall resistance of 20 mOhm to 150 mOhm, preferably 30 mOhm to 60 mOhm. For example if each heating resistor 13a has, for example, a resistance of 60 mOhm at 20° C., the heating device 10 therefore has an overall resistance of 30 mOhm at 20° C.

The heating device 10 is premounted here, as shown in FIG. 2. That is to say the heating elements 11, 12 are electrically and mechanically connected via the connecting elements 14, 15 before the heating device 10 is arranged on the cell housing 2. The connecting elements 14, 15 are embodied in a hinge-like fashion and for this purpose embodied flexibly in certain areas. The heating elements 11, 12 are embodied in such a way that they can be folded onto one another via the hinge-like connecting elements 14, 15. In order to arrange the heating device 10 on the cell housing 2, for example the first heating element 11 is arranged on the front side 6. After the arrangement of the first heating element 11 on the front side 6, the second heating element 12 is folded over the housing cover 4 and arranged on the rear side 9. The inner sides 18 of the heating elements 11, 12 can be embodied, for example, in an adhesive fashion, so that the heating elements 11, 12 can be bonded to the lateral outer sides 6, 9. The connecting elements 14, 15 are guided in a ribbon-like manner over the housing cover 4 and arranged between cell terminals 19, 20 of the battery cell 1 here. A heating current which is made available by an energy source can be fed into the heating resistors 13 via the connecting elements 14, 15.

The connecting elements 14, 15 each have a contact plate 21 here, as is shown for example in FIG. 3. The contact plate 21 can have an adhesive layer 23, for example on its underside 22, and is therefore bonded tight to the housing cover 4. The adhesive layer 23 can be, for example, an adhesive pad. A length 24 of the contact plate 21 can be, for example, approximately 10 mm, a width 25 of the contact plate 21 can be between 15 mm and 19 mm, and a thickness 26 of the contact plate 21 can be approximately 1 mm. The connecting elements 14, 15 have here a length, as a result of which a distance 27 of the heating elements 11, 12 (see FIG. 2) corresponds approximately to a thickness of the battery cell 1. The distance 27 can be, for example, 21 mm. In order to make available the hinge effect, the connecting elements 14, 15 also have flexible conductors 28, for example ribbon cables here. Via these flexible conductors 28, the contact plate 21 of the first connecting element 14 is electrically connected to the first terminal 16 of the first and second heating elements 11, 12, and the contact plate 21 of the second connecting element 15 is electrically connected to the second terminals 17 of the first and second heating elements 11, 12. The heating elements are also connected mechanically via the flexible conductors 28.

In the state in which the heating device 10 is arranged on the cell housing 2, the heating elements 11, 12 cover the lateral outer sides 6, 9 virtually completely, in particular by at least 90%. If the cell housing 2 has, for example, a height 29 of approximately 85 mm, the heating elements 11, 12 each have a height 30 of approximately 78 mm. If the cell housing 2 has a width 31 of approximately 173 mm, the heating elements 11, 12 have, for example, in each case a width 32 of approximately 165 mm. Therefore, when the battery cell 1 is heated, a homogeneous temperature distribution within the cell housing 2 and a high input of heating into the cell housing 2 can be made available.

Furthermore, the heating device 10 is embodied symmetrically with respect to an axis A. The axis A is here also the axis of symmetry of the cell housing 2 and therefore of the battery cell 1. As a result, the first connecting element 14 is at the same distance from the side area 7 of the cell housing 2 as the connecting element 15 is from the side area 8 of the cell housing 2. If a plurality of battery cells 1 are then stacked on one another to form the cell stack, the connecting elements 14, 15 are thus arranged along two parallel rows on an upper side, formed by the housing covers 4 of the battery cells 1, of the cell stack. Therefore, the connecting elements 14, 15 can be electrically connected to two straight busbars and connected to respective module terminals of the battery module. In order to connect the connecting elements 14, 15 to the busbars, the busbars can be welded to the contact plates 21 of the connecting elements 14, 15.

The module connections of the battery cells 1 are electrically connected to the cell terminals 19, 20 of the battery cells 1 so that the heating devices 10 of the battery cells 1 can be supplied with electrical energy of the battery cells 1. When there is a parallel connection of battery cells 1, for example all the first cell terminals 19 are connected to a first module terminal, and all the second cell terminals 20 are connected to a second module terminal. Furthermore, the first connecting elements 14 are connected to one another and to the first module terminal, and the second connecting elements 15 are connected to one another and to the second module terminal. The first connecting elements 14 and/or the second connecting elements 15 are each connected to the respective module terminal via a controllable switching element here. If there is no heating requirement, the respective switching element is opened so that the heating elements 11, 12 are not supplied with any heating current. When there is a heating requirement, the respective switching element can be closed so that the heating elements 11, 12 are supplied with a heating current.

LIST OF REFERENCE SYMBOLS

1 Battery cell
2 Cell housing
3 Housing floor
4 Housing cover
5 Housing casing
6,7,8,9 Outer sides
10 Heating device
11,12 Heating elements
13 Heating foil
13a Heating resistor
14, 15 Connecting elements
16, 17 Terminals
18 Inner side of the heating elements
19, 20 Cell terminals
21 Contact plate
22 Underside of the contact plate
23 Adhesive layer
24 Length of the contact plate
25 Width of the contact plate
26 Thickness of the contact plate
27 Distance of the heating elements
28 Conductor
29 Height of the cell housing
30 Height of the heating elements
31 Length of the cell housing
32 Length of the heating elements
A Axis

What is claimed is:

1. A prismatic battery cell for a high-voltage battery of a motor vehicle, comprising:
    a cell housing with a housing casing and a housing cover, on which cell terminals of the battery cell are arranged; and
    a heating device comprising
        two sheet-shaped heating elements for arrangement on two opposite lateral outer sides of the cell housing of the battery cell; and
        two connecting elements which connect the two heating elements mechanically and electrically at only one edge of each of the two sheet-shaped heating elements, with remaining edges being free of any connections, for arrangement on a top housing cover of the cell housing and for connecting to an energy source which makes available a heating current to each of the two sheet-shaped heating elements via the two connecting elements, wherein
    in order to energize the heating elements with the heating current, the first connecting element is electrically connected to first terminals of the two heating elements, and the second connecting element is electrically connected to second terminals of the two heating elements,
    the connecting elements are embodied flexibly, at least in certain areas, and as a result the heating elements are connected in a hinged manner, and
    the heating device is arrangeable on the cell housing by arranging the first heating element on a first lateral outer side of the cell housing, folding the second heating element, connected in a hinged manner to the first heating element via the connecting elements, over the top housing cover and arranging the second heating element on a second lateral outer side, whereby
    the sheet-shaped heating elements are arranged on the two opposite lateral outer sides of the housing casing and the connecting elements are arranged between the cell terminals on the housing cover.

2. The prismatic battery cell according to claim 1, wherein the sheet-shaped heating elements each have a heating foil with an integrated heating resistor which is energizable.

3. The prismatic battery cell according to claim 1, wherein inner sides, facing the lateral outer sides, of the heating elements include an adhesive so that the heating elements are attachable in a materially joined fashion on the lateral outer sides.

4. The prismatic battery cell according to claim 1, wherein in order to electrically insulate the battery cell, equipped with the heating device, from an adjacent battery cell in a cell stack of the high-voltage battery, outer sides of the heating elements that face away from the lateral outer sides, are embodied in an electrically insulating manner.

5. The prismatic battery cell according to claim 1, wherein the heating device is embodied in an axial-symmetrical manner.

6. The prismatic battery cell according to claim 1, wherein a size of a surface of the heating elements corresponds to at least 90% of a size of a surface of the lateral outer sides.

7. The prismatic battery cell according to claim 1, wherein a height of the heating elements is at least 90% of a height of the cell housing, and
a length of the heating elements is at least 90% of a length of the cell housing.

8. The prismatic battery cell according to claim 1, wherein a height of the heating elements is between 60 mm and 90 mm, and
a length of the heating elements is between 150 mm and 180 mm.

9. The prismatic battery cell according to claim 6, wherein the heating elements each have a thickness of at most 200 μm.

10. The prismatic battery cell according to claim 6, wherein
the heating elements each have a thickness of 150 μm.

11. The prismatic battery cell according to claim 1, wherein
the connecting elements each comprise:
a contact plate for electrically connecting to the energy source which makes available the heating current; and
a flexible conductor, wherein
the contact plates of the connecting elements are electrically connected to the respective terminals of the heating elements via the flexible conductors.

12. A battery module for a high-voltage battery of a motor vehicle comprising:
a plurality of battery cells according to claim 1, wherein the plurality of battery cells are stacked one on the other; and
two module terminals which are electrically connected to the cell terminals of the battery cells in accordance with a predetermined wiring arrangement, wherein
in order to make available the heating current from the battery cells, the first connecting elements of the heating devices are electrically connected to one another and to the first module terminal, and the second connecting elements of the heating devices are electrically connected to one another and to the second module terminal, wherein the first connecting elements and/or the second connecting elements are connected to the respective module terminal via a controllable switching element.

13. A high-voltage battery for a motor vehicle comprising at least one battery module according to claim 12.

14. A motor vehicle comprising a high-voltage battery according to claim 13.

15. A heating device for a prismatic battery cell of a high-voltage battery of a motor vehicle, comprising:
two sheet-shaped heating elements for arrangement on two opposite lateral outer sides of a cell housing of the battery cell; and
two connecting elements which connect the two heating elements mechanically and electrically at only one edge of each of the two sheet-shaped heating elements, with remaining edges being free of any connections, for arrangement on a top housing cover of the cell housing and for connecting to an energy source which makes available a heating current to each of the two sheet-shaped heating elements via the two connecting elements, wherein
in order to energize the heating elements with the heating current, the first connecting element is electrically connected to first terminals of the two heating elements, and the second connecting element is electrically connected to second terminals of the two heating elements,
the connecting elements are embodied flexibly, at least in certain areas, and as a result the heating elements are connected in a hinged manner,
the heating device is arrangeable on the cell housing by arranging the first heating element on a first lateral outer side of the cell housing, folding the second heating element, connected in a hinged manner to the first heating element via the connecting elements, over the top housing cover and arranging the second heating element on a second lateral outer side,
the connecting elements each comprise:
a contact plate for electrically connecting to the energy source which makes available the heating current; and
a flexible conductor, wherein
the contact plates of the connecting elements are electrically connected to the respective terminals of the heating elements via the flexible conductors, and
an under side, facing the housing cover, of the contact plates has an adhesive layer for adhering on the housing cover of the cell housing.

* * * * *